(12) United States Patent
Sewell

(10) Patent No.: US 9,782,874 B2
(45) Date of Patent: Oct. 10, 2017

(54) TIRE STEM TORQUE TOOL

(71) Applicant: George Sewell, Freeport, FL (US)

(72) Inventor: George Sewell, Freeport, FL (US)

( * ) Notice: Subject to any disclaimer, the term of this patent is extended or adjusted under 35 U.S.C. 154(b) by 2 days.

(21) Appl. No.: 14/632,373

(22) Filed: Feb. 26, 2015

(65) Prior Publication Data

US 2016/0250737 A1    Sep. 1, 2016

(51) Int. Cl.
*B25B 13/48* (2006.01)
*F16K 15/20* (2006.01)
*B25B 13/08* (2006.01)
*B25B 27/00* (2006.01)
*B25B 27/24* (2006.01)

(52) U.S. Cl.
CPC ............. *B25B 13/48* (2013.01); *B25B 13/08* (2013.01); *B25B 27/0035* (2013.01); *B25B 27/24* (2013.01); *F16K 15/20* (2013.01)

(58) Field of Classification Search
CPC ......... B25B 13/48; F16K 15/20; B60C 25/18; B60C 29/06; B60C 29/005; B60C 29/00; B60C 29/04; Y10T 137/6109
See application file for complete search history.

(56) References Cited

U.S. PATENT DOCUMENTS

| | | | | | |
|---|---|---|---|---|---|
| 1,686,640 | A | * | 10/1928 | Pierce, Jr. ............... | B60C 25/18 29/221.5 |
| 2,501,217 | A | * | 3/1950 | Hawn ..................... | F16C 1/04 285/179 |
| 2,839,820 | A | * | 6/1958 | Bates ..................... | B25B 27/306 29/227 |
| 3,002,409 | A | * | 10/1961 | Jones ..................... | B25G 1/025 59/78 |
| D269,497 | S | * | 6/1983 | Rogowsky ............... | D8/88 |
| 4,528,735 | A | * | 7/1985 | Eastridge ................ | B60C 25/18 29/221.5 |
| 5,471,899 | A | * | 12/1995 | Twomlow ............... | B25G 1/043 403/109.3 |
| 5,507,083 | A | * | 4/1996 | Redgrave ............... | B25B 27/306 29/227 |
| 5,732,456 | A | * | 3/1998 | Frey ...................... | B25B 27/306 29/227 |
| 6,108,882 | A | * | 8/2000 | Hodgson ................ | B25B 27/306 269/6 |
| 6,122,810 | A | * | 9/2000 | McInnes ................ | B25B 27/023 29/255 |
| 6,186,033 | B1 | * | 2/2001 | Faro, Sr. ............... | B25B 23/0014 81/177.6 |
| 6,543,112 | B1 | * | 4/2003 | Knaebel ................. | B25B 27/24 29/221.5 |

(Continued)

*Primary Examiner* — Craig Schneider
*Assistant Examiner* — Kevin Barss
(74) *Attorney, Agent, or Firm* — Garrett James O'Sullivan

(57) ABSTRACT

A tire stem torque device is provided for tightening a valve stem of a tire mounted with one or more auxiliary tires on an axle of an automobile, without dismounting one or more of the auxiliary tires from the axle. The tire stem torque device includes a head member, an elongate member attached to the head member, and a handle attached to a distal end of the elongate member. The head member is configured of multiple sizes and defines a space configured to receive a valve stem of multiple sizes. The elongate member is configured of an adjustable length to create sufficient torque for the tightening of the valve stem of the tire.

9 Claims, 5 Drawing Sheets

(56) References Cited

U.S. PATENT DOCUMENTS

| | | | | |
|---|---|---|---|---|
| 6,574,843 B1* | 6/2003 | Meadows | ............... | B25B 27/24 29/221.5 |
| 6,612,005 B2* | 9/2003 | Rivers | ..................... | B25B 27/24 29/221.5 |
| 7,017,247 B2 | 3/2006 | Detzel | | |
| 7,237,463 B1* | 7/2007 | Lee | ........................ | B25G 1/063 81/177.7 |
| D594,719 S * | 6/2009 | Birgl | ................................ | D8/14 |
| 7,676,896 B1* | 3/2010 | Carscadden | ............ | B25B 23/18 254/25 |
| 8,214,986 B2* | 7/2012 | Kicksee | ................ | B60C 29/007 206/372 |
| 8,245,747 B2* | 8/2012 | Monjuvent | ......... | B60C 23/0408 152/427 |
| 2004/0060157 A1 | 4/2004 | Benefield | | |
| 2008/0127472 A1 | 6/2008 | Whitehead | | |
| 2012/0080151 A1 | 4/2012 | Shipman | | |
| 2012/0255399 A1 | 10/2012 | Caraballo | | |
| 2013/0333177 A1* | 12/2013 | Clemetson | ............... | B25B 27/14 29/402.01 |

* cited by examiner

TIRE STEM TORQUE TOOL

BACKGROUND

A large number of vehicles, for example, heavy duty trucks such as trailers or light duty trucks such as pickup trucks, typically are multi-wheeled comprising two or more wheels mounted on each side of a single axle. The multi-wheeled feature increases the overall stability and the payload or the towing capacity of these vehicles. For enhancing the stability and the payload of these multi-wheeled vehicles, an optimum amount of air pressure needs to be maintained in each of the tires. Valve stems used for filling air in the tires of these vehicles are typically mounted inside a wheel rim on which the tire is mounted. These valve stems are either press fitted or secured with help of retainer nuts inside the wheel rim. Due to vibrations and shocks experienced while in transit, the retainer nuts tend to loosen and in turn leak air from the tires through the valve stems. Moreover, these multi-wheeled vehicles typically are subjected to a constant usage year round in all the seasons. Use of these vehicles in cold climates leads to the tire valve stem gasket becoming hard and losing its seal on the wheel rim. This in turn leads to leakage of air from the tire through the valve stems. Therefore, the valve stems are required to be tightened periodically in order to maintain an optimum amount of tire inflation.

Traditionally use of a conventional wrench for valve repair, for example, tightening of a leaking valve stem of a tire mounted on an inner side of a multi-wheeled vehicle, would typically require un-mounting one or more tires on the outside to execute the valve repair and then remounting each of the un-mounted outside tires. This un-mounting and remounting of the outside tires is time consuming and labor intensive for the mechanics performing the valve repair. Typically the time required in performing the valve repair with the conventional wrenches is about one hour to about two hours and is therefore a labor intensive and costly process. Moreover, the conventional wrenches available for performing the valve repairs are neither designed with adjustable lengths nor adjustable to multiple sizes and multiple head diameters. Furthermore, the wrench heads are linearly attached to the wrench bodies thus adding to the amount of mechanical force required to be exerted by the mechanics for tightening the valve stems. Furthermore, these conventional wrenches are not designed to access inaccessible areas of a wheel rim and therefore increase the time required in performing the valve repairs.

Hence, there is a long felt but unresolved need for a tire stem torque device that allows tightening of a valve stem of a tire mounted on an inner side of an axle without un-mounting one or more tires mounted on the axle on an outside of the tire. Moreover, there is a need for an improved, cost effective tire stem torque device with adjustable length that enables creation of maximum torque for tightening the valve stem with minimum work effort, in minimum time. Furthermore, there is a need for a tire stem torque device that comprises a head member configurable in multiple sizes and diameters and that is attached to the body of the tire stem torque device at a predefined angle allowing easy tightening of the valve stem located at inaccessible areas inside the wheel rim.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention discloses a tire stem torque device for tightening a valve stem of a tire, the device comprising: a head member defining a space configured to receive the valve stem of the tire. The device further comprises an elongate member rigidly attached to the head member at a predefined angle for tightening, wherein the elongate member is configured to create a torque required for the tightening of valve stem of the tire. A handle rigidly attached to a distal end of the elongate member, wherein the distal end is at an opposite end from the head member.

In an embodiment, the tire stem torque device may comprise an open ended head member or a closed ended head member. The open ended head member comprises a head bifurcated into two arms and configured to define a space there-between for receiving the valve stem or a retainer nut. Whereas the closed ended head member comprises a loop defining a central space configured to receive the valve stem or retainer nut.

The tire stem torque device disclosed herein addresses the above stated need for tightening a valve stem of a tire mounted on an inner side of an axle without un-mounting one or more tires mounted on the axle on an outside of the tire. Moreover, the tire stem torque device disclosed herein is configured of an adjustable length that creates maximum torque for tightening the valve stem with minimum work effort, in minimum time, and with maximum cost-effectiveness. Furthermore the tire stem torque device the tire stem torque device disclosed herein comprises a head member configured in multiple sizes and diameters and that is attached to the body of the tire stem torque device at a predefined angle for tightening the valve stem located at inaccessible areas inside the wheel rim.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

DETAILED DESCRIPTION OF THE INVENTION

Figure 1A:
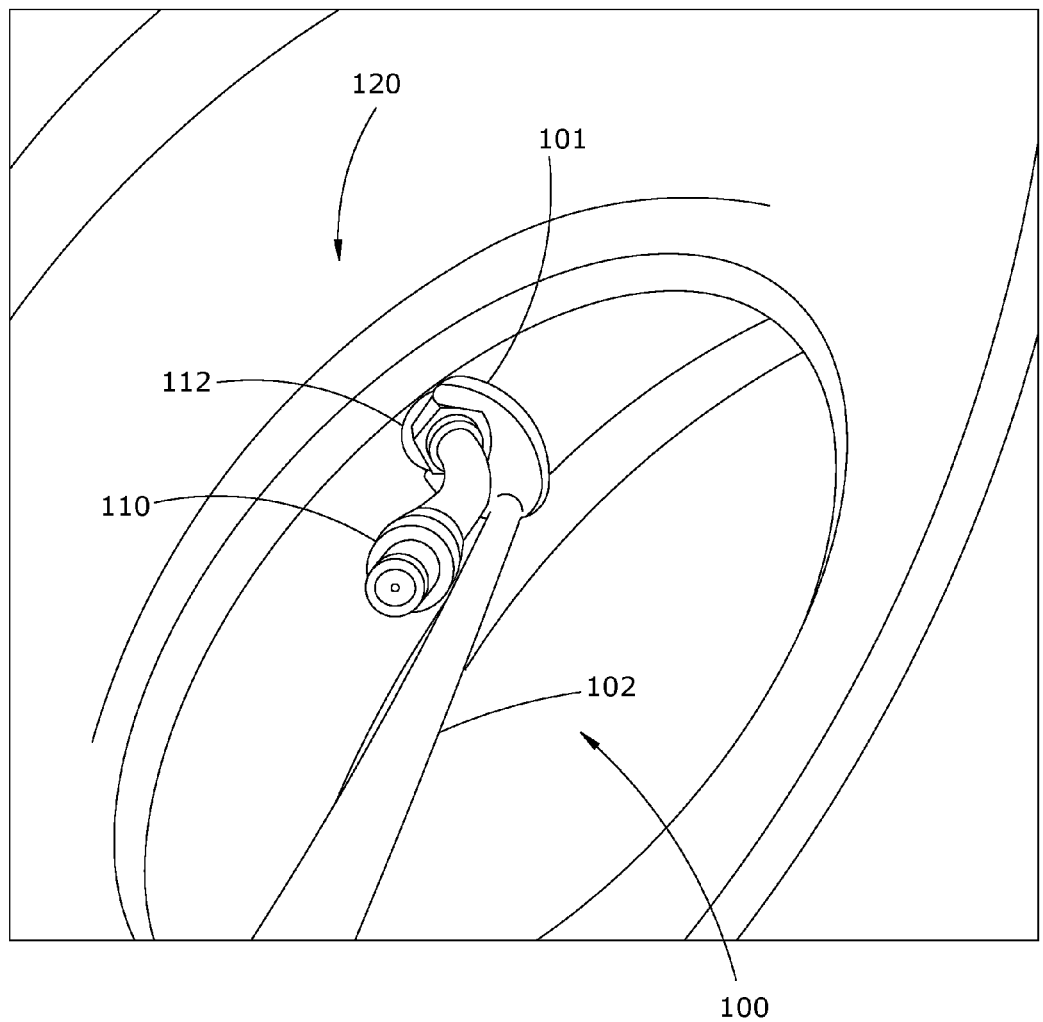
FIGS. 1A-1B exemplarily illustrate different perspective views of a tire stem torque device for tightening a valve stem of a tire.
Figure 1B:
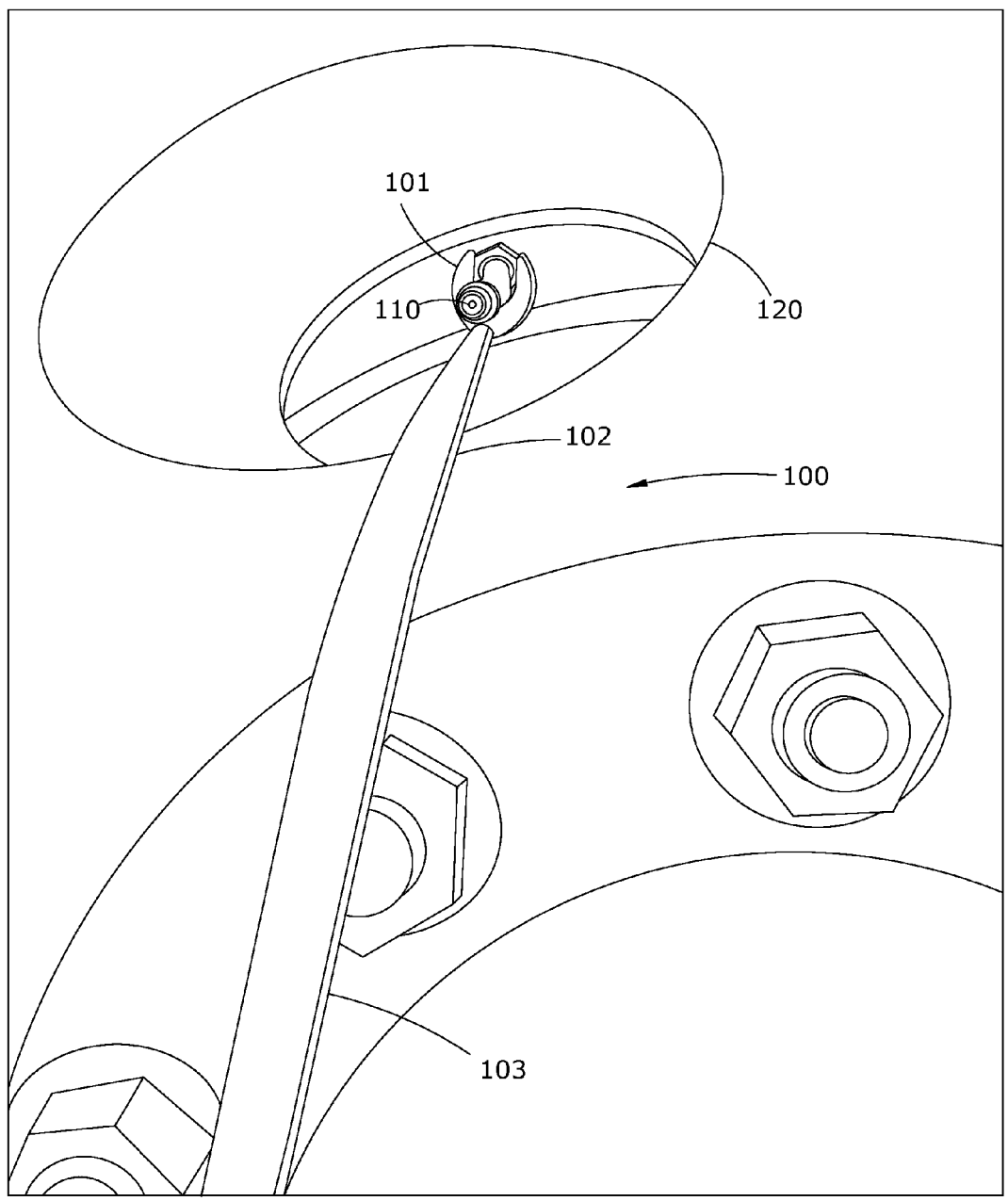

FIGS. 1A-1B shows exemplary perspective views of a tire stem torque (TST) device 100 for tightening of a valve stem 110 of a tire 120, according to an embodiment of the present invention. The TST device 100 disclosed herein comprises a head member 101, the head member may comprise open ended or closed ended head defining a space configured to receive said valve stem 110 or a retainer nut 112 annularly surrounding the leaking valve stem 110 of said tire 120. An elongate member 102 attached to said head member 101 forming a tightening angle, wherein the elongate member 102 configured to create a torque required for said tightening; and a handle 103 attached to a distal end of the elongate member 102. The TST device 100 is made of one or more of multiple materials comprising, for example, metal, plastic, etc.

Figure 2A:
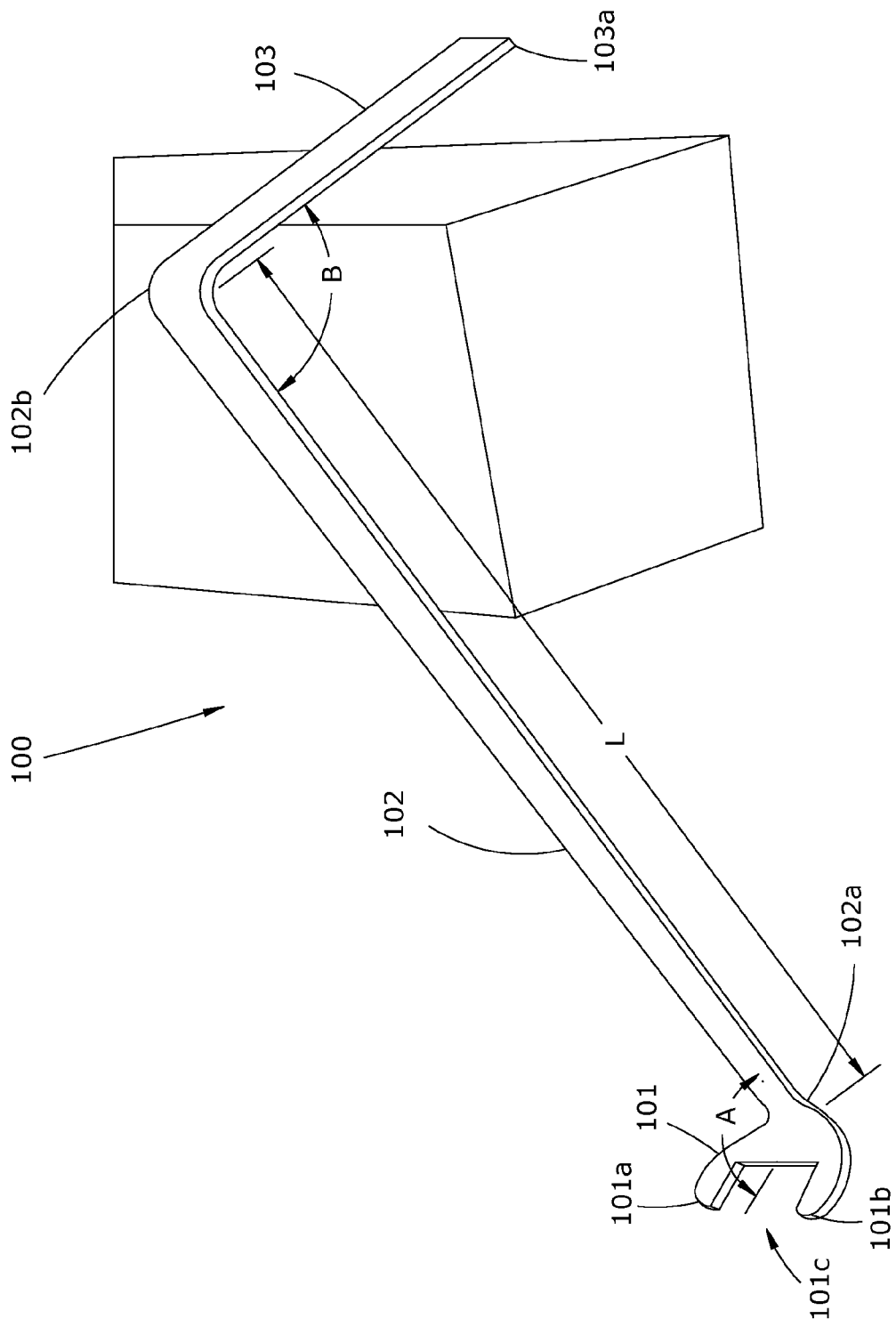
FIG. 2A-2B exemplarily illustrates different perspective views of the tire stem torque device.
Figure 2B:
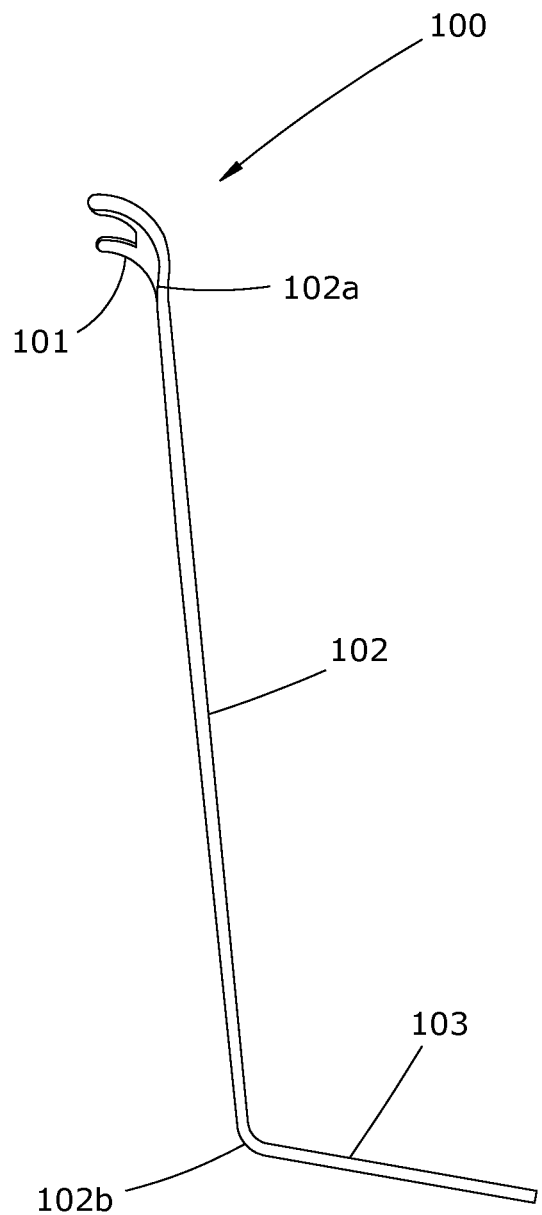

FIGS. 2A-2B exemplarily illustrate different perspective views of a tire stem torque (TST) device 100 according to an embodiment of the present invention. FIG. 2A exemplarily illustrates a top perspective view of the TST device 100. FIG. 2B exemplarily illustrates a side perspective view of the TST device 100. The TST device 100 disclosed herein comprises a head member 101, an elongate member 102, and a handle 103. In an embodiment, the head member 101 comprises a bifurcated head member. As used herein, "bifurcated head member" refers to a mechanical structure rigidly attached to a proximal end 102a of the elongate member 102 and is bifurcated into two arms 101a and 101b configured to define a space 101c there-between for receiving the valve stem. In an embodiment, the bifurcated head member 101 defines a space 101c for receiving a retainer nut annularly surrounding the valve stem.

The bifurcated head member 101 is, for example, of a generally U shape as exemplarily illustrated in the FIG. 2A-2B. For purposes of illustration, the detailed description refers to the bifurcated head member 101 being configured as a generally U shaped bifurcated head member 101 for receiving the valve stem in the space 101c; however, the scope of the TST device 100 disclosed herein is not limited to the bifurcated head member 101 being configured as a generally U shaped bifurcated head member 101, but may be extended to include multiple shapes comprising, for example, a V shape, a W shape, an O shape, a multi-pronged shape, etc., and other functionally equivalent structures to define one or more spaces 101c of multiple dimensions to receive the valve stems of multiple dimensions. Thus, the bifurcated head member 101 is configured of multiple sizes including but not limited to metric and standard sizes, for example, 14 mm, 15 mm, 16 mm, and ⅝ inch, for receiving the valve stem of multiple sizes. In an embodiment, the preferable sizes of the bifurcated head member 101 are 14 mm and ⅝ inch.

In an embodiment, the proximal end of the elongate member 102 is rigidly attached to the bifurcated head member 101 at a predefined tightening angle A. The predefined tightening angle A is preferably around 60 degrees to about 70 degrees, allowing easy access to valve stem present on the inner side of the wheel rim. In an embodiment, the predefined tightening angle A is 65 degrees. In another embodiment, the predefined tightening angle A is manually configurable. In this embodiment, for example, the bifurcated head member 101 is adjustably attached to the elongate member 102 at one or more predefined tightening angles A. In another embodiment, the bifurcated head member 101 is removably and/or replaceably attached to the elongate member 102. In an embodiment, connecting the bifurcated head member 101 to the elongate member 102 at the predefined tightening angle A facilitates the tire stem torque (TST) device 100 to access a valve stem located in inaccessible areas on a wheel rim.

The elongate member 102 is configured of an adjustable length L for creation of a torque required for tightening of the valve stem of the tire. As used herein, the term "torque" refers to a twisting force used for pivotally rotating an object, for example, the valve stem received in the space 101c of the bifurcated head member 101. The torque created is a product of the length L of the elongate member 102 and the force exerted by a user, for example, a mechanic, of the tire stem torque (TST) device 100. Therefore longer the length L lesser is the force required to be exerted by the mechanic to create the torque sufficient for tightening of the valve stem. In an embodiment, the elongate member 102 is configured as a telescopic elongate member 102. The elongate member 102 is adjustable in length L from about 12 inches to about 23 inches. The adjustable length L of the elongate member 102 facilitates creation of an optimum amount of torque required for tightening the valve stem of a multiple types of tires located in multiple mounting configurations comprising, for example, dual wheeled automobiles, triple-wheeled automobiles, etc. The adjustable length L of the elongate member 102 and the predefined tightening angle A of connection of the bifurcated head member 101 to the elongate member 102, facilitates tightening of the valve stem of a tire mounted with one or more auxiliary tires on an axle of an automobile, without dismounting one or more of the auxiliary tires from the axle. In an embodiment, the tire is mounted on an inner side on the axle with the auxiliary tires mounted on the outside of the tire on the axle. In another embodiment, the tire is mounted between the auxiliary tires on the axle.

The handle 103 is rigidly attached to a distal end 102b of the elongate member 102. The distal end 102b is at an opposite end from the bifurcated head member 101. The handle 103 is rigidly attached to the distal end 102b of the elongate member 102 at a predefined operation angle B. In an embodiment, the predefined operation angle B is 90 degrees. The predefined operation angle B is configured to provide a user of the tire stem torque (TST) device 100 with maximum comfort of use. In an embodiment, the handle 103 is made from one or more of multiple materials comprising, for example, plastic, metal, wood, rubber, etc. In another embodiment, the handle 103 is configured to provide a grip to the user of the TST device 100 while tightening the valve stem. In an embodiment, the TST device 100 comprises two bifurcated head members 101. In this embodiment, the two bifurcated head members 101 are rigidly attached to the proximal end 102a of the elongate member 102 and a free end 103a of the handle 103 respectively.

Figure 3:
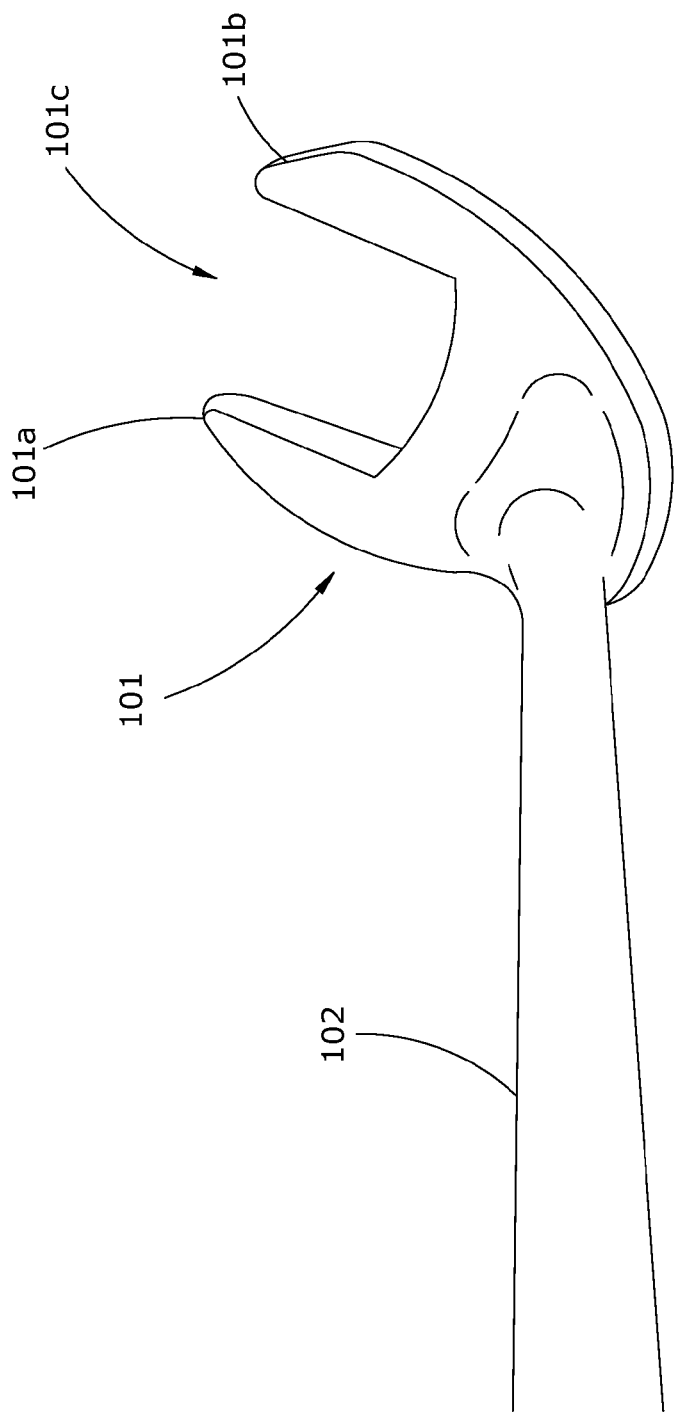
FIG. 3 exemplarily illustrates an enlarged view of a bifurcated head member of the tire stem torque device.

FIG. 3 exemplarily illustrates an enlarged view of a bifurcated head member 101 of the tire stem torque (TST) device 100 exemplarily illustrated in FIGS. 1A-1B. In an embodiment, the arms 101a and 101b of the bifurcated head member 101 are configured to be laterally adjustable with respect to each other. In this embodiment, the lateral adjustment of the arms 101a and 101b facilitates defining of a space 101c of an adjustable area there-between. In this embodiment, the bifurcated head member 101 can adjustably receive valve stems of multiple dimensions or retainer nuts of the valve stems of multiple dimensions without replacing the bifurcated head member 101 or without using different TST devices 100 with fixed bifurcated head members 101.

In an exemplary embodiment, wherein a user, for example, a mechanic holding the TST device 100 about a handle 103 exemplarily illustrated in FIGS. 1A-1B, positions the TST device 100 proximal to a leaking valve stem 110 of a tire 120, in a way, so as to securely receive the leaking valve stem 110 or a retainer nut 112 annularly surrounding the leaking valve stem 110, in the space 101c of the bifurcated head member 101. In another example, using the TST device 100 as illustrated in FIGS. 2A-2B, the mechanic can adjust a length L of the elongate member 102 based on a position of the mechanic with respect to the leaking valve stem, for example, a distance between the mechanic and the tire. The mechanic exerts a force perpendicular to the length L of the elongate member 102 using the handle 103 so as to rotate the received valve stem or the received retainer nut in a clockwise direction. The mechanic repeatedly exerts this force till the leaking valve stem is tightened and there is no leakage of air through the valve stem from the tire. In an embodiment, the TST device 100 tightens the leaking valve stem of the tire in approximately less than about 3 minutes in contrast to the conventional tools which takes about 1-2 hours of operation.

In an embodiment, the tire stem torque device may comprise a closed head member defining a central space configured to receive the valve stem or retainer nut. The tire stem torque (TST) device can be manufactured using different types of metals and may comprise a flat metal body as shown in FIGS. 1-3. However, the TST device may also comprise a round metal body, thus allowing versatility of use for different types of jobs. In a different embodiment, the head member of the TST device is configured to flex at any angle depending on the job, in contrast to stationary head member, thereby facilitating performing a variety of jobs with the device.

In another embodiment, the handle of the TST device is configured to be flexible at different angles, which allows tightening a stem nut from different directions and angles, thus enhancing convenience and efficiency.

The TST device of the present invention offers a versatile tool that can be used for different mechanic jobs by different mechanics for a range of vehicles comprising the aforementioned tire valve stems. For example, the TST device can be used for steel and aluminum wheels of heavy duty vehicles including 18 wheeled trucks, trailers and heavy duty farm and construction equipment as well as small automobiles, lawn mowers etc.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A tire stem torque device for tightening a valve stem of a tire, said tire stem torque device comprising:
    a) a head member defining a space configured to receive said valve stem of said tire;
    b) an elongate member rigidly attached to said head member, at a proximal end of said elongate member forming a first obtuse head angle therebetween, so as to form a rigidly attached head having a longitudinal axis, wherein said elongate member configured to creates a torque required for said tightening of said valve stem of said tire; and
    c) a handle rigidly attached to a distal end of said elongate member and forming an alternate obtuse head angle therebetween, said handle having a longitudinal axis parallel to the longitudinal axis of said head member, so as to form a rigidly attached handle having a longitudinal axis, wherein said distal end of said elongate member is at an opposite direction from said head member; and
    wherein said rigidly attached head extends from said proximal end of said elongate member in a substantially diametrically opposite direction than said rigidly attached handle extends from said distal end of said elongate member, and said longitudinal axis of said rigidly attached head is substantially parallel to said longitudinal axis of said rigidly attached handle, wherein the tire stem torque device rotationally engages said valve stem, and wherein said rotational engagement applies a torque of said valve stem, and wherein said longitudinal axis of said head member, and said longitudinal axis of said handle member are not parallel to an axis of said elongate member.

2. The tire stem torque device of claim 1, wherein said first obtuse head angle is in a range of 120 degrees to 110 degrees.

3. The tire stem torque device of claim 1, wherein said handle is rigidly attached to said distal end of said elongate member at a predefined operation angle.

4. The tire stem torque device of claim 1 facilitates said tightening of said valve stem of said tire mounted with one or more auxiliary tires on an axle of an automobile, wherein said valve stem is tightened without dismounting one or more of said one or more auxiliary tires from said axle.

5. The tire stem torque device of claim 1 is manufactured from one or more of a plurality of materials comprising metal and plastic.

6. The tire stem torque device of claim 1, wherein said space is an aperture, and wherein said valve stem extends through said aperture, when in use.

7. The tire stem torque device of claim 1, wherein said space has a non-continuous circumference, wherein said head member is bifurcated, and wherein said valve stem enters said space through an opening in said non-continuous circumference.

8. The tire stem torque device of claim 3, wherein said valve stem comprises a retainer nut, and wherein said tire stem torque device rotationally engages said retainer nut.

9. The tire stem torque device of claim 8, wherein said operation angle is manually configured, wherein said operation angle is adjusted based on a position of the valve stem.

* * * * *